(12) United States Patent
Kawaguchi et al.

(10) Patent No.: US 12,709,412 B2
(45) Date of Patent: Aug. 18, 2026

(54) SPACECRAFT-BORNE PROPULSION DEVICE WITH GAS HEATING AND GAS STORAGE

(71) Applicant: TOHOKU UNIVERSITY, Sendai (JP)

(72) Inventors: Junichiro Kawaguchi, Sendai (JP); Yuji Saito, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 0 days.

(21) Appl. No.: 18/695,223

(22) PCT Filed: Sep. 28, 2021

(86) PCT No.: PCT/JP2021/035644
§ 371 (c)(1),
(2) Date: Mar. 25, 2024

(87) PCT Pub. No.: WO2023/053207
PCT Pub. Date: Apr. 6, 2023

(65) Prior Publication Data

US 2024/0400234 A1 Dec. 5, 2024

(51) Int. Cl.
*B64G 1/40* (2006.01)
*B64G 1/26* (2006.01)
*F02K 9/60* (2006.01)

(52) U.S. Cl.
CPC ............... *B64G 1/401* (2013.01); *B64G 1/26* (2013.01); *B64G 1/40* (2013.01); *B64G 1/402* (2013.01); *B64G 1/411* (2023.08); *F02K 9/605* (2013.01)

(58) Field of Classification Search
CPC .......... B64G 1/401; B64G 1/26; B64G 1/411; B64G 1/413; F02K 9/42; F02K 9/44; F02K 9/46
See application file for complete search history.

(56) References Cited

U.S. PATENT DOCUMENTS 4,821,508 A * 4/1989 Burton .................. F03H 1/0087 60/204
7,762,498 B1 * 7/2010 Henderson ............. B64G 1/401 244/171.1

(Continued)

FOREIGN PATENT DOCUMENTS

DE 102018114868 A1 * 12/2019
JP 2008101597 A 5/2008

(Continued)

OTHER PUBLICATIONS

International Search Report (with English translation) for corresponding Application No. PCT/JP2021/035644, dated Dec. 21, 2021, 4 pages.

(Continued)

*Primary Examiner* — Kyle Robert Thomas
(74) *Attorney, Agent, or Firm* — Dority & Manning, P.A.

(57) ABSTRACT

A spacecraft-borne propulsion device includes a propellant storage mechanism including a propellant storage container that stores a propellant in a vapor-liquid equilibrium state or a liquid phase, the propellant being ethanol or an aqueous ethanol solution; a propellant transport mechanism configured to supply, with an electric pump, the propellant under pressurization to a pressure exceeding 1 atm at room temperature; a gas heating mechanism including a heater including a separate heater for heating up connected via a check valve; a thruster head mechanism having a nozzle that generates a thrust with a heated gas; and a power supply mechanism including a storage battery for driving the electric pump and the heater for heating up. The propellant storage mechanism, the propellant transport mechanism, the gas heating mechanism, and the thruster head mechanism are connected in series.

4 Claims, 1 Drawing Sheet

(56) References Cited

U.S. PATENT DOCUMENTS

| | | | | |
|---|---|---|---|---|
| 9,909,574 | B1 * | 3/2018 | Heimanowski | F02K 9/97 |
| 9,989,012 | B2 * | 6/2018 | Izumiyama | F02K 7/02 |
| 2007/0295009 | A1 | 12/2007 | Calabro | |
| 2015/0152812 | A1 | 6/2015 | Izumiyama et al. | |
| 2017/0210493 | A1 * | 7/2017 | Marchandise | B64G 1/443 |
| 2020/0283174 | A1 | 9/2020 | Kokorich et al. | |

FOREIGN PATENT DOCUMENTS

| | | | |
|---|---|---|---|
| JP | 2008517199 | A | 5/2008 |
| JP | 2017522226 | A | 8/2017 |
| WO | WO 2014/024966 | A1 | 2/2014 |

OTHER PUBLICATIONS

Jun Asakawa et al., "Development of Small Water Resist Jet Thruster Aquarius", Journal of the Japan Society for Aeronautical and Space Sciences, Oct. 5, 2018, No. 10, vol. 66, pp. 296-301.

Richard E. Wirz et al., Electrospray Thruster Performance and Lifetime Investigation for the LISA Mission, Conference Paper, AIAA Propulsion and Energy 2019 Forum, Aug. 19, 2019, pp. 1-27.

* cited by examiner

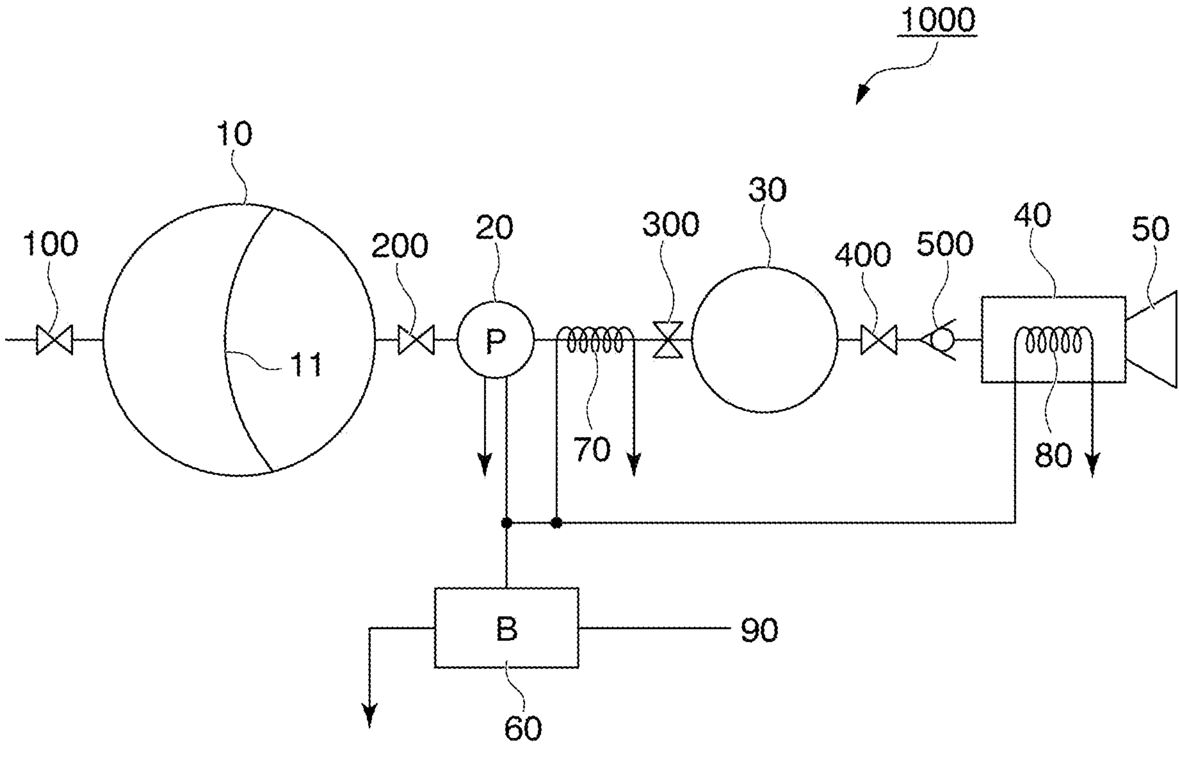
1000
10
100
200
20
P
300
30
400
500
40
50
11
70
80
B
90
60

SPACECRAFT-BORNE PROPULSION DEVICE WITH GAS HEATING AND GAS STORAGE

CROSS-REFERENCE TO RELATED APPLICATIONS

This application is the U.S. National Stage entry of International Application No. PCT/JP2021/035644, filed on Sep. 28, 2021, which is hereby incorporated herein by reference in its entirety for all purposes.

TECHNICAL FIELD

The present invention relates to a spacecraft-borne propulsion device.

BACKGROUND ART

A propulsion engine that uses a liquefied gas as a propellant and that generates a gas by electrically heating the liquefied gas has a simple system, and is thus adopted in a small or micro-small spacecraft. A propulsion engine (resist jet engine) of a type that further reheats the generated gas to raise a temperature thereof can increase a specific impulse, and is thus applied when a large load is required.

An engine using such a liquefied gas as a propellant often use or rely on a vapor pressure of the liquefied gas to supply the liquefied gas under pressurization.

This is because, typically, water can be stored under a very low vapor pressure of lower than 1 atm at room temperature, which simplifies a mechanism and reduces a weight of the mechanism system.

However, in order to achieve a large thrust, it is necessary to use a liquefied gas having a high vapor pressure as a propellant, or to seal another gas (pressurant gas) in the propellant container for pressurization. Therefore, a mass of the container that stores the propellant becomes very large.

In order to generate the gas from the liquefied gas, it is first necessary to add an amount of heat equivalent to latent heat. When trying to obtain a large thrust, a propellant mass flow rate increases, resulting in consumption of a large amount of power. Therefore, in a small spacecraft with restricted power, an expected magnitude of the thrust often cannot be obtained.

In particular, in a resist jet engine that performs reheating after gasification, power for the reheating is superimposed in addition to the latent heat. Therefore, restriction in terms of power is more severe.

As described above, in the small spacecraft, it is required to reduce a weight of the container that stores the liquefied gas as the propellant and to reduce power consumption. Therefore, in most cases, the thrust of the propulsion engine using the liquefied gas as the propellant is generally restricted to be very small.

However, since a high-density propellant can be used by transporting the propellant in a liquid form, the mechanism can be easily simplified, resulting in a low cost in system configuration, and therefore, the resist jet engine has been widely used particularly in a small satellite.

A typical thrust of a propulsion device that generates a gas by supplying a propellant under pressurization using a vapor pressure or another pressurant gas is a value obtained by multiplying a value, which is obtained by multiplying an under-pressurization-supply pressure value by a nozzle throat area, by a thrust coefficient of several times. This is the same for the resist jet engine, and a gas pressure during a reheating process is substantially equal to the pressure applied to the propellant.

An actual magnitude of the thrust depends on the vapor pressure of the liquefied gas to be used. Typically, in order to enable storage under a very low vapor pressure of lower than 1 atm at room temperature, for example, the thrust becomes very small in an engine using water as a propellant.

A method is also adopted in which the propellant is supplied under pressurization using a pressurant gas such as nitrogen gas. However, this method causes an increase in mass of a propellant storage container. Therefore, supply at an extremely high pressure naturally has a limit because advantages of the resist jet engine are actually reduced.

PTL 1 discloses a space propulsion system that includes a resist jet and an electrostatic thruster, in which one of these is selected, by using a switch, to be activated.

PTL 2 discloses an electrothermal propulsion device that uses a liquefied gas having a low vapor pressure as a propellant. In the same invention, the propellant is limited to an organic compound, and water is not listed as a substance constituting the propellant.

PTL 3 discloses an invention relating to an electrothermal type thruster including a heating section in a resist jet using a photovoltaic cell.

NPL 1 discloses an invention relating to a resist jet that uses water as a propellant and that supplies the propellant at a vapor pressure.

CITATION LIST

Patent Literature

PTL 1: JP2017-522226A

PTL 2: JP2008-101597A

PTL 3: JP2008-517199A

Non Patent Literature

NPL 1: Jun Asakawa, and three others, "Development of Small Water Resist Jet Thruster AQUARIUS", [online], published on Oct. 5, 2018, Journal of the Japan Society for Aeronautical and Space Sciences, pp. 296-301, No. 10, Vol. 66, 2018, [searched on Sep. 8, 2021], Internet <URL:https://www.jstage.jst.go.jp/article/kjsass/66/10/66_296/_article/-char/ja/>

SUMMARY OF INVENTION

Technical Problem

Typically, in a resist jet engine of a type in which a liquid having a very low vapor pressure of lower than 1 atm at room temperature, that is, a liquefied gas is used as a propellant, the propellant is electrically heated to generate a gas, and the gas is further reheated to raise a temperature thereof to increase a specific impulse, there are the following problems.

Since the liquefied gas having a low vapor pressure is used as the propellant, even when a pressurant gas is used, it is difficult to greatly exceed the vapor pressure of the propellant because a mass of a storage container increases accordingly, resulting in difficulty in obtaining a large thrust.

It is restricted to generate a gas for obtaining a thrust having an expected magnitude from the liquefied gas and to ensure power required in a process of further reheating the gas. This makes it difficult to supply the required power.

In particular, it is expected to use water as a propellant due to a large specific impulse, but it is necessary to ensure additional power to prevent freezing.

The invention has been made in view of the above problems, and an object thereof is to provide a spacecraft-borne propulsion device (resist jet engine) that simultaneously solves the three problems.

Solution to Problem

In order to solve the above problems and achieve the above object, a spacecraft-borne propulsion device has been devised by taking the following measures.

According to an aspect of the invention, there is provided a spacecraft-borne propulsion device including: a propellant storage mechanism including a propellant storage container that stores a propellant in a vapor-liquid equilibrium state or a liquid phase, the propellant being ethanol or an aqueous ethanol solution; a propellant transport mechanism configured to supply, with an electric pump, the propellant under pressurization to a pressure exceeding 1 atm at room temperature; a gas heating mechanism including a heater including a separate heater for heating up connected via a check valve; a thruster head mechanism having a nozzle that generates a thrust with a heated gas; and a power supply mechanism including a storage battery for driving the electric pump and the heater for heating up. The propellant storage mechanism, the propellant transport mechanism, the gas heating mechanism, and the thruster head mechanism are connected in series.

The invention relates to a resist jet engine in which ethanol (ethyl alcohol) having a very low vapor pressure sufficiently lower than 1 atm at room temperature or an aqueous solution thereof is used as a propellant, a pressure of the propellant is typically increased by an electric pump to a pressure exceeding 1 atm at room temperature, the propellant is supplied to a heater for gas generation or a heater, and a large-capacity storage battery that stores energy required for gas generation or reheating according to a time of acceleration is provided.

According to this configuration, the vapor pressure of the propellant is sufficiently low. Therefore, a propellant storage container can be manufactured to be thin and extremely lightweight.

A thrust can be set by a pressure increasing capacity of the electric pump that supplies the propellant to the heater for gas generation and the heater regardless of the vapor pressure of the propellant and a pressure of a pressurant gas. Therefore, a large thrust can be obtained by increasing the pressure to a pressure exceeding 1 atm at room temperature.

By charging the storage battery for a long time using only a part of power that can be constantly supplied on a spacecraft, a large amount of energy required for driving the propulsion engine can be ensured for a certain time without being restricted by power generated by a solar cell. Here, when the storage battery is required to have a charging and discharging function, a secondary storage battery is basically borne as the storage battery. However, when only one-time injection is required, a primary storage battery may be borne in order to omit a charging device on the spacecraft.

The aqueous solution containing ethanol as a solute can easily lower a freezing point. Therefore, it is not necessary to ensure power for preventing freezing.

In addition, an average molecular weight of a mixed gas obtained by gasification of the propellant can be ensured in a wide range between pure ethanol and water. In addition, a decrease in density of the aqueous solution can be limited to a slight extent. Therefore, a decrease in mass of the propellant that can be stored in the propellant storage container can be kept to a slight extent.

Advantageous Effects of Invention

The invention relates to a method based on an idea different from that of a related-art resist jet engine for obtaining a thrust by vaporizing and heating a liquefied gas.

In the related art, a concept of supply under pressurization using a vapor pressure of a liquefied gas has been fixed. Even when a pressurant gas is used, a measure to avoid an increase in pressure of the pressurant gas has been adopted from a viewpoint of avoiding an increase in mass of a propellant storage container. Therefore, there has been no doubt for a small thrust in the propulsion engine.

This leads to a small mass flow rate of the required liquefied gas. In addition, power that can be continuously ensured on a spacecraft is very restricted, particularly in an micro-small satellite. This also leads to a fixed idea that it is appropriate to construct a small-thrust propulsion engine with small power.

In the related art, it has been blindly believed that it is difficult to store a large amount of energy in a lightweight storage battery because a technique for storing energy is immature. However, for example, a lithium polymer battery has a very high energy density and can be sufficiently adapted to and borne on an micro-small spacecraft.

In the related art, as in a case of a turbo pump, the use of the pump has been considered only for obtaining an extremely high supply pressure. Therefore, the focus is not on the use of a pump that increases a pressure at a low level and that has a small flow rate. A pressure exceeding 1 atm at room temperature is so low that the pressure does not even qualify as a high-pressure gas, but is sufficient for increasing a thrust. Power required for a small-scale pump is sufficiently small, and the pump is sufficiently lightweight and can be sufficiently adapted to and borne on an micro-small spacecraft.

Water has a small molecular weight and a large specific impulse to be obtained, but has a high freezing point, which causes difficulty in practical use in that it is necessary to ensure additional power. By using ethanol or an aqueous solution thereof as a propellant, a freezing point can be sufficiently lowered and power necessary to prevent freezing can be eliminated.

When vaporizing an aqueous solution, a phenomenon called azeotropy in which a vaporization rate of a substance having a low boiling point increases is known. When the mixed aqueous solution is directly guided to the heater for gas generation, ethanol and water in the aqueous solution are vaporized at the same ratio by heating to a temperature exceeding the freezing point of water under the pressure. Therefore, a mass ratio of both in the obtained mixed gas can remain the same as that of the original propellant aqueous solution.

According to the invention, a weight of the propellant storage container can be reduced. A large thrust can be obtained regardless of the vapor pressure of the propellant and the pressure of the pressurant gas. A large-power propulsion engine can be operated while maintaining power that can be constantly supplied on the spacecraft. A freezing point temperature of the propellant can be sufficiently lower than 0° C. As described above, it is not necessary to ensure power for preventing freezing. The inventions disclosed in the above PTLs and NPL are completely different from the invention relating to a resist jet in which a non-freezing liquefied gas having a low vapor pressure is used as a propellant, a pump is used to increase a thrust instead of the vapor pressure, and a storage battery is provided for power supply.

BRIEF DESCRIPTION OF DRAWINGS

FIG. 1 is a configuration diagram of a resist jet propulsion engine according to the invention, in which ethanol or an aqueous solution thereof is used as a propellant and an electric pump and a storage battery are combined.

DESCRIPTION OF EMBODIMENTS

FIG. 1 is a diagram showing a configuration of a resist jet propulsion engine according to the invention, in which ethanol or an aqueous ethanol solution having a very low vapor pressure of sufficiently lower than 1 atm at room temperature is used as a propellant and an electric pump and a high energy density storage battery are combined. Hereinafter, the resist jet propulsion engine according to the invention is referred to as a propulsion device 1000. The propulsion device 1000 increases a specific impulse by electrically heating the propellant to generate a gas and further reheating the gas to raise a temperature thereof. The propulsion device 1000 is intended to be spacecraft-borne, for example.

The propulsion device 1000 includes a propellant storage container 10 (propellant storage mechanism), an electric pump 20 (propellant transport mechanism), a gas storage tank 30 (gas storage mechanism), a heater 40 (gas heating mechanism), a nozzle 50 (thruster head mechanism), a storage battery 60 (power supply mechanism), and a heater for gas generation 70 (gas generation mechanism). The propulsion device 1000 according to the invention has the following configuration. That is, as shown in FIG. 1, the propellant storage container 10, the electric pump 20, the heater 40, and the nozzle 50 are connected in series. The heater for gas generation 70 and the gas storage tank 30 are connected in series, and are inserted and connected in series between the electric pump 20 and the nozzle 50.

The propellant storage container 10 stores a propellant in a vapor-liquid equilibrium state or a liquid phase.

The propellant storage container 10 stores the propellant. As shown in FIG. 1, the propellant storage container 10 includes a propellant bladder 11 therein. The propellant bladder 11 is a bag-shaped member serving to separate the propellant into a gas and a liquid. In order to prevent an equilibrium state of gas-liquid mixing from occurring on a propellant side, a non-propellant side of the propellant bladder 11, that is, a side of the propellant storage container 10 where the propellant is not stored, is filled with a pressurant gas at a pressure slightly higher than a vapor pressure of the propellant. The pressurant gas is made of a substance different from that of the propellant, and for example, nitrogen is used. The non-propellant side of the propellant bladder 11 is filled with the pressurant gas from a first valve 100 shown in FIG. 1, and the pressurant gas is exhausted therefrom. In other words, the non-propellant side of the propellant bladder 11 is a side of the propellant storage container 10 where the first valve 100 shown in FIG. 1 is located. The first valve 100 is a valve for filling with and exhausting the pressurant gas.

The electric pump 20 supplies the propellant under pressurization to a pressure exceeding 1 atm at room temperature. The propellant stored in the propellant storage container 10 is supplied to the electric pump 20 via a second valve 200. A known pump is used as the electric pump 20.

The second valve 200 and a third valve 400 to be described later are valves that can be opened and closed manually or remotely from a spacecraft side.

A pressure of the propellant having passed through the second valve 200 is typically increased to a pressure exceeding 1 atm at room temperature by the electric pump 20. A gas having an increased pressure passes through the heater for gas generation 70 for generating a gas, and the generated gas is stored in the gas storage tank 30 via a pressure reducer 300.

A pressure value of the gas storage tank 30 is read at the spacecraft side. In order to avoid re-condensation of the gas inside the gas storage tank 30, the spacecraft controls the second valve 200 to reduce a pressure inside the gas storage tank 30 and maintain the pressure at a predetermined pressure. The pressure adjustment mechanism may be omitted in a simple system.

The gas storage tank 30 is a container for storing, at the predetermined pressure, the gas generated by the heater for gas generation 70 via the pressure reducer 300. A known pressure reducer is used as the pressure reducer 300.

The gas storage tank 30 serves as a buffer tank for alleviating pressure fluctuations that occur in a process of discharging the propellant through the nozzle 50. At the same time, the gas storage tank 30 serves to avoid a gas-liquid mixed phase within the heater 40.

The heater 40 including a separate heater for heating up 80 connected via a check valve 500. The check valve 500 serves to avoid backflow of the gas within the heater 40.

The heater 40 accommodates the heater for heating up 80, and serves to heat the gasified propellant to a specified temperature at which an expected specific impulse can be exhibited. Typically, a temperature of the heater 40 is in a range of about 100° C. to 1000° C., and is adjusted according to specifications.

The nozzle 50 generates a thrust with a heated gas. The propellant heated by the heater 40 is discharged through the nozzle 50. The propulsion device 1000 generates a thrust by reaction when discharging the propellant.

The storage battery 60 drives the electric pump 20, the heater for gas generation 70, and the heater for heating up 80. For example, a lithium polymer battery is used as the storage battery 60. The storage battery 60 is not limited thereto, and any known battery may be used as the storage battery 60. In addition, the spacecraft or the like bearing the propulsion device 1000 may include a solar cell.

The electric pump 20, the heater for gas generation 70, and the heater for heating up 80 are supplied with power by discharging the storage battery 60 having a high energy density, and are basically operated in a manner that does not consume normal spacecraft power 90 for the borne device.

The storage battery 60 is charged with a part of the spacecraft power 90 while the propulsion engine is stopped. A remote control valve may be inserted between the heater 40 and the nozzle 50 to the extent that a heat-resistant function can be exhibited.

The heater for gas generation 70 functions by receiving the power supplied from the storage battery 60. The heater for gas generation 70 electrically heats the propellant to generate the gas.

Although one system is drawn in series in FIG. 1, all or some of the systems may be configured in parallel. Specifically, it is as described below.

As shown in FIG. 1, mechanisms of the propulsion device 1000 having the above configuration are connected in series.

In other words, the propellant passes through one path from the propellant storage container 10 to the nozzle 50. Here, a plurality of paths may be provided in parallel in the propulsion device 1000. When the plurality of paths are provided, the above mechanisms may be shared by the plurality of paths.

In other words, in the propulsion device 1000 having the above configuration, a plurality of at least some of the mechanisms among the propellant storage container 10, the electric pump 20, the heater 40, and the nozzle 50 may be connected in parallel. Hereinafter, a plurality of the above configurations connected in parallel are referred to as a first propulsion unit. A plurality of first propulsion units may be provided. The plurality of first propulsion units may be connected in series.

In addition, a plurality of at least some of the propellant storage container 10, the electric pump 20, the heater for gas generation 70, the gas storage tank 30, the heater 40, and the nozzle 50 may be connected in parallel. Hereinafter, a plurality of the above configurations connected in parallel are referred to as a second propulsion unit. A plurality of second propulsion units may be provided. The plurality of second propulsion units may be connected in series.

A simple form in which the heater for gas generation 70, the pressure reducer 300, the gas storage tank 30, and the third valve 400 are omitted, the electric pump 20 and the check valve 500 are directly connected to each other, and the liquid propellant is directly supplied to the heater 40 may be adopted as an embodiment.

A case where a propellant storage mechanism is the propellant storage container 10, a propellant transport mechanism is the electric pump 20, a gas storage mechanism is the gas storage tank 30, a gas heating mechanism is the heater 40, a thruster head mechanism is the nozzle 50, a power supply mechanism is the storage battery 60, and a gas generation mechanism is the heater for gas generation 70 has been described in the above embodiment, but the invention is not limited thereto.

For example, the propellant storage mechanism may include another configuration in addition to the propellant storage container 10. The propellant transport mechanism may include another configuration in addition to the electric pump 20. The gas storage mechanism may include another configuration in addition to the gas storage tank 30. The gas heating mechanism may include another configuration in addition to the heater 40. The thruster head mechanism may include another configuration in addition to the nozzle 50. The power supply mechanism may include another configuration in addition to the storage battery 60. The gas generation mechanism may include another configuration in addition to the heater for gas generation 70.

INDUSTRIAL APPLICABILITY

According to the spacecraft-borne propulsion device 1000 in the invention, a weight of the propellant storage container 10 can be reduced, a large thrust can be obtained regardless of a vapor pressure of the propellant and a pressure of the pressurant gas, a large-power propulsion engine can be operated while maintaining power that can be constantly supplied on the spacecraft, a freezing point temperature of the propellant can be sufficiently lower than 0° C., and it is not necessary to ensure power for preventing freezing, and thus the propulsion device 1000 is industrially useful.

REFERENCE SIGNS LIST

10: propellant storage container
11: propellant bladder
20: electric pump
30: gas storage tank
40: heater
50: nozzle
60: storage battery
70: heater for gas generation
80: heater for heating up
90: spacecraft power
100: first valve
200: second valve
300: pressure reducer
400: third valve
500: check valve
1000: propulsion device

The invention claimed is:

1. A resist jet propulsion engine in a small or micro-small spacecraft including a resist jet engine, in order to achieve a large thrust and further increase a specific impulse, the resist jet propulsion engine comprising:

a mechanism for propellant storage including at least one propellant storage container that stores a liquefied gas propellant in a vapor-liquid equilibrium state or a liquid phase;

a mechanism for propellant transport pressurizing, with at least one electric pump, the propellant to a pressure exceeding 1 atm at room temperature;

a contained gas generation mechanism including at least one electric gas generation heater;

a contained gas storage mechanism including at least one gas storage tank that stores gas generated by the contained gas generation mechanism at a predetermined pressure via a pressure reducer;

a mechanism for gas heating including at least one electric heater further accommodated for heating up the propellant to be discharged;

a mechanism for thruster head having at least one nozzle that generates a thrust with the propellant heated; and a mechanism for power supply including at least one battery for driving both the at least one electric pump and the at least one electric heater, wherein the mechanism for propellant storage, the mechanism for propellant transport, the mechanism for gas heating, and the mechanism for thruster head are connected in series, and the contained gas generation mechanism and the contained gas storage mechanism are connected in series, and are inserted and connected in series between the mechanism for propellant transport and the mechanism for gas heating.

2. The resist jet propulsion engine according to claim 1, wherein a plurality of paths are provided in parallel, in each of which at least one said mechanism for propellant storage, at least one said mechanism for propellant transport, at least one said mechanism for gas heating and at least one said mechanism for thruster head are connected in series.

3. The resist jet propulsion engine according to claim 1, wherein a plurality of paths are provided in parallel, in each of which at least one said mechanism for propellant storage, at least one said mechanism for propellant transport, at least one said mechanism for gas generation, at least one said mechanism for gas storage, at least one said mechanism for gas heating and at least one said mechanism for thruster head are connected in series.

4. The resist jet propulsion engine according to claim 1, wherein the propellant is an ethanol or an aqueous ethanol solution.

* * * * *